United States Patent [19]
Robinson

[11] Patent Number: 5,303,966
[45] Date of Patent: Apr. 19, 1994

[54] TORQUE CONVERTER RETAINING TRANSMISSION TRANSPORT DEVICE

[76] Inventor: Larry M. Robinson, P.O. Box 354, Magnolia, Tex. 77355

[21] Appl. No.: 763,454
[22] Filed: Sep. 20, 1991
[51] Int. Cl.$^5$ .............................................. B65G 7/12
[52] U.S. Cl. ..................................... 294/15; 254/134
[58] Field of Search ................. 294/15, 16, 67.1–67.3, 294/67.5, 81.1, 81.2, 81.3, 81.4, 81.5, 86.41, 141, 142, 145, 158, 165, 167; 29/244, 270, 278, 281.1, 281.6, 283; 254/133 R, 134, DIG. 16; 269/3, 6, 17, 46, 47, 71

[56] References Cited

U.S. PATENT DOCUMENTS

| | | | |
|---|---|---|---|
| 237,711 | 2/1881 | Taylor . | |
| 2,193,054 | 3/1940 | Bowen | 294/15 |
| 2,427,104 | 9/1947 | Hosler | 294/15 |
| 2,434,655 | 1/1948 | Homer . | |
| 2,748,459 | 6/1956 | Orr | 254/134 X |
| 3,012,311 | 12/1961 | Shupe | 254/134 |
| 3,062,500 | 11/1962 | Arnes et al. | 254/DIG. 16 X |
| 3,136,526 | 6/1964 | Wolf | 254/134 X |
| 4,239,196 | 12/1980 | Hanger | 269/17 |
| 4,307,877 | 12/1981 | Rogos | 269/17 X |
| 4,549,722 | 10/1985 | Gagliano | 254/DIG. 16 X |
| 5,033,717 | 7/1991 | Symon | 254/134 X |

FOREIGN PATENT DOCUMENTS 563418 12/1923 France .................................. 294/16

*Primary Examiner*—Johnny D. Cherry
*Attorney, Agent, or Firm*—Harrison & Egbert

[57] ABSTRACT

A device for retaining a torque converter within a bell housing of a transmission including a fixing member, attachment members for affixing the fixing member across a portion of the bell housing, and an abutment member connected to the fixing member and extending for an adjustable distance therefrom. The fixing member is a rigid plate having a first aperture and a second aperture formed through the rigid plate. Threaded members extend through these apertures and are suitable for engagement with a threaded opening on the bell housing so as to affix the rigid plate to the bell housing. The abutment member is an adjustable bolt that is received by a slot transverse to the apertures on the rigid plate. The rigid plate has perpendicular longitudinal sides. At least one handle is affixed to the side of the rigid plate opposite the abutment member.

7 Claims, 5 Drawing Sheets

TORQUE CONVERTER RETAINING TRANSMISSION TRANSPORT DEVICE

TECHNICAL FIELD

The present invention relates to apparatus suitable for carrying a bell housing of a transmission. More particularly, the present invention relates to devices for retaining a torque converter in a fixed position within the bell housing of a transmission. Additionally, the present invention relates to tools which are useful for the removal and repair of transmissions.

BACKGROUND ART

The transmission of an automobile is a speed-changing device. The transmission is installed in the drive train that connects the crankshaft of the engine to the driving wheels. This permits the engine to operate at a higher speed when its full power is needed and to slow down to a more economical speed when less power is needed. Under some conditions, as in starting a stationary vehicle or in ascending steep grades, the torque of the engine is insufficient, and amplification is desired. Most devices employed to change the ratio of the speed of the engine to the speed of the driving wheels multiply the engine torque by the same factor by which the engine speed is increased.

The only major difficulty in the operation of the early manual sliding-gear transmission was the need for simultaneously operating the accelerator pedal, the clutch pedal, and the gearshift lever. The automatic transmission was developed to eliminate this manipulation. Most automatic transmissions employ either a fluid coupling or a hydraulic torque converter, a device for transmitting and amplifying the torque produced by the engine. Each type provides for manual selection of reverse and a low range that either prevents automatic upshifts or employs a lower gear ratio than is used in normal driving. By 1970 the hydraulic torque converter-type automatic transmission dominated its field. In hydraulic transmissions, shifting is done by a speed-sensitive governing device that changes the position of valves that control the flow of hydraulic fluid. The vehicle speeds at which shifts occur depend upon the position of the accelerator pedal, and the driver can delay upshifts until higher speed is attained by depressing the accelerator pedal further. Control is by hydraulically engaged bands and multiple disk clutches running in oil, either by the driver's operation of the selector lever or by a speed-sensitive governor. Compound planetary gear trains with multiple sun gears and planet pinions have been designed to provide a low forward speed, an intermediate speed, a reverse, and a means of locking into direct drive. This unit is used with various modifications in almost all hydraulic torque-converter transmissions.

In hydraulic torque-converter transmissions, torque is multiplied by means of gear trains and a hydraulic member with three or more elements. Oil in the housing is accelerated outward by rotating vanes in the pump impeller and, reacting against vanes in the turbine impeller, forces them to rotate. Oil then passes into the stator vanes, which redirect it to the pump. The stator serves as a reaction member providing more torque to turn the turbine than was originally applied to the pump impeller by the engine. Blades in all three elements are specially contoured for their specific function and to achieve particular multiplication characteristics. Through a clutch linkage, the stator is allowed gradually to accelerate until it reaches the speed of the pump impeller. The hydraulic elements are combined with two or three planetary gear sets, which further provide torque multiplication between the turbine and the output shafts.

In the maintenance and repair of automatic transmissions, it is usually necessary to remove the transmission from the vehicle and dismantle it in order to adequately inspect all of the components thereof. Automatic transmissions are generally heavy, bulky objects which are not easy to handle or move. Furthermore, it is preferable that certain areas of the transmission are not forced to carry substantial weight due to their fragile nature. Therefore, it is desirable to have a stable support which can allow the transmission to be easily and quickly maneuvered without causing harm to the body of the transmission.

Importantly, during the repair of transmissions, the torque converter generally lies loosely within the interior of the bell housing of the automatic transmission. During typical transmission repair operations, the torque converter will fall from the bell housing or will constantly be tossed to-and-fro. In the storage of automatic transmissions, the torque converter often becomes lost, misplaced, or otherwise separated from the transmission housing from which it originated. Even when the torque converter is retained within the bell housing of the transmission, the shafts associated with the torque converter can become damaged, distorted, or otherwise inappropriate for continued use. Therefore, it is very desirable to maintain the stability of the torque converter within the bell housing of the transmission during transport, storage, and repair of transmissions.

One U.S. patent, in the past, has addressed the need for tools and fixtures during the movement of transmissions. U.S. Pat. No. 4,307,877, issued on December 29, 1981, to D. D. Rogos describes a rigid elongated framework which contains a transverse mounting member at one end for attachment to the bell housing of the transmission. A belt is wrapped around the opposite end of the framework and transmission to pull the transmission forward into the framework. A central extendible support member is moved into engagement with the center of the transmission body to insure secure engagement between the transmission and the framework. The framework and transmission can be moved between several positions for providing easy access to any part of the transmission. This device, however, did not provide a suitable mechanism for the retention of the torque converter within the bell housing of the transmission.

It is a object of the present invention to provide a carrying device for a bell housing of a transmission which is suitable for allowing workers to lift the transmission. It is another object of the present invention to provide a carrying device that includes a suitable mechanism for the retention of a torque converter in its natural position within the bell housing.

It is another object of the present invention to provide a carrying device and a torque converter retention device which is easy to manufacture, easy to use, and relatively inexpensive.

These and other objects and advantages of the present invention will become apparent from a reading of the attached specification and appended claims.

SUMMARY OF THE INVENTION

The present invention is a device for the retaining of a torque converter within the bell housing of a transmission and a device for the carrying and transport of an automatic transmission. The device of the present invention comprises a fixing member, a means for attaching the fixing member across a portion of the bell housing, and an abutment member connected to the fixing member and extending for an adjustable distance therefrom. The abutment member is suitable for abutting the torque converter so as to fix the position of the torque converter within the bell housing. The fixing member, in one embodiment, comprises a first strap with a means for attaching the strap to the bell housing at one end, a second strap with a means for attaching the second strap to the bell housing at an end, and a locking mechanism for fixing the other ends of the first and second straps together. The straps have a length suitable for extending across a portion of the bell housing. The abutment member is affixed to a surface of the first and second straps and is in contact with the torque converter.

In another embodiment, the fixing member comprises a rigid plate. This rigid plate is configured so as to fit flat against the end of the bell housing. When a rigid plate is used, the means for attaching the plate to the bell housing comprises a first aperture formed through a portion of the rigid plate, a second aperture formed through another portion of the rigid plate, and at least one threaded member extending through these apertures. The threaded member is suitable for engagement with a threaded opening on the end of the bell housing so as to affix the rigid plate to the bell housing. In this embodiment, the abutment member is an adjustable bolt that is threadedly fastened to the rigid plate and has a surface suitable for engagement with the torque converter. Each of the first and second apertures is a slot having a length aligned with the longitudinal axis of the rigid plate. Each of these apertures receive threaded members so as to fasten the plate to the bell housing. The abutment member includes a third slot which is positioned between the first and second slots and is aligned transverse to the longitudinal sides of the rigid plate. The adjustable bolt is received by the third slot.

The rigid plate is a member having longitudinal sides extending perpendicularly thereto. In essence, the rigid plate has a E-shaped configuration. The perpendicular longitudinal sides add to the structural strength and integrity of the rigid plate. The longitudinal sides extend in one direction from the rigid plate. The abutment member, however, extends perpendicularly in an opposite direction from the rigid plate.

In another embodiment of the present invention, a frame is rigidly affixed to the fixing member (or to the rigid plate). This frame has a slot formed therein of a suitable size for receiving a fork from a forklift. The frame is positioned, relative to the fixing member, so as to extend exterior of the bell housing of the transmission when the fixing member is attached to the end of the bell housing. In this embodiment. the abutment member comprises a base member which is affixed to the fixing member and extends downwardly therefrom. This base member is positioned in proximity to the torque converter. A threaded member extends inwardly from this base member transverse to the plane of the base member.

In all of the embodiments, the rigid plate has a handle portion attached thereto. In one instance, t he handle portion extends from one of the longitudinal sides and is offset from the rigid plate and extends parallel thereto. The handle portion has a flexible material which is fastened over an outer edge of the handle portion so as to comfortably receive the hands of a human being and provide the human being with sufficient leverage so as to support the bell housing of the transmission.

Alternatively, the handle member is fastened to the fixing member and extends outwardly therefrom. In particular, the handle of the present invention comprises a first handle and a second handle that extend outwardly perpendicularly to the fixing member on a side of the fixing member opposite the abutment member. These handles may be attached to the mounting bolts or may be separately affixed to the rigid plate. Each of the handles may have a pivot point therein. When a pivot point is used, one portion of the handle is rotated about the pivot point with respect to another portion of the handle. A stop is provided so as to allow the handle to be fixed in a position perpendicular to the fixing member.

DETAILED DESCRIPTION OF THE INVENTION

Figure 1:
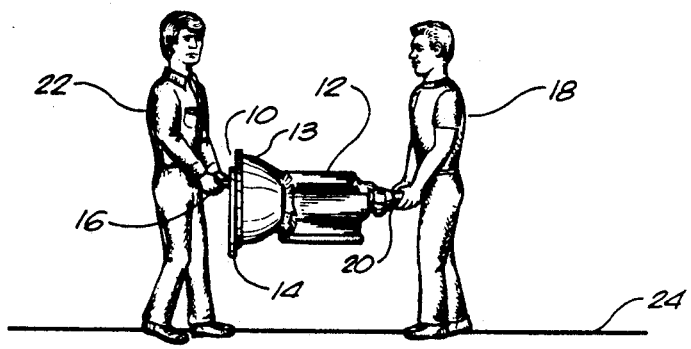
FIG. 1 is an illustration showing the present invention as used for the carrying of a transmission housing.

Referring to FIG. 1, there are shown at 10 the device for carrying a bell housing of a transmission and for retaining a torque converter therewithin in accordance with the preferred embodiment of the present invention. In particular, FIG. 1 is an illustration showing the manner in which the transmission housing 12 can be carried by using the device 10 of the present invention. Device 10 is shown as having a fixing member 14 which fastens to the bell housing 13 of transmission 12. A handle 16 extends outwardly from a surface of the fixing member 14.

In the normal process of removing a transmission from a vehicle, it is necessary for two persons, or an automated vehicle, to properly lift the transmission 12. In the prior techniques. The person 18 would hold the tailpiece 20 of transmission 12. The other person 22 would be required to manipulate the bell housing 13. A torque converter is received within the transmission housing 12. Normally, the torque converter is maintained within the housing 12 in a loose manner. In prior art techniques, the person 22 would be required to lift the bell housing end 13 and to manipulate it so as to retain the torque converter therewithin.

In contrast, the present invention 10 fastens to the bell housing 13 of transmission 12 so as to secure the torque converter therewithin. Handle 16 extends outwardly and perpendicularly to the fixing member 14 so that person 22 can easily handle the bell housing 13 of transmission 12. In this manner, the persons 18 and 22 can properly manipulate the transmission as required. The fixing member 14 and handle 16 allow the persons 18 and 22 to support the transmission 12 above a surface 24. The configuration of the present invention allows for the fixing member 14 to be adapted to a wide variety of transmission bell housings 13.

Figure 2:
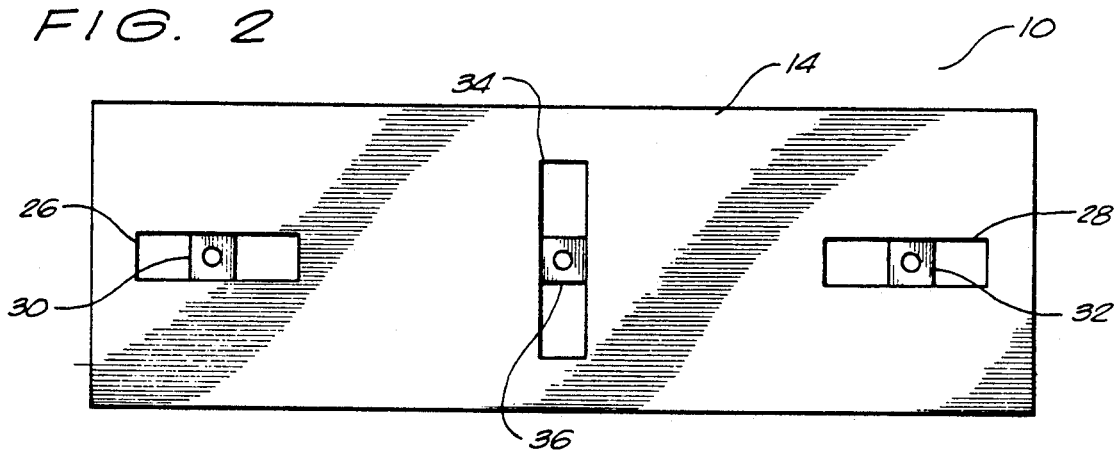
FIG. 2 is a frontal elevational view of the device of the present invention.

FIG. 2 is a detailed view showing the fixing member 14 of the device 10 of the present invention. Generally, the fixing member 14 is a flat rigid plate made of steel, aluminum, or other solid material. The fixing member 14, as shown in FIG. 2, has a generally rectangular configuration. The length of fixing member 14 should be sufficient so as to extend across the open end of a bell housing of a transmission. It is important that the fixing member 14 be adapted to various types of bell housings. Since the diameter of the bell housing of various transmissions can vary significantly, the rigid plate 14 is provided with a first aperture 26 and a second aperture 28. The first aperture 26 and the second aperture 28 are formed through the rigid plate 14 so as to present an open area extending therethrough. As can be seen, the first aperture 26 is aligned with the second aperture 28 generally near the middle of rigid plate 14. The apertures 26 and 28 are horizontal apertures which extend across the longitudinal axis of plate 14. In normal use, it is believed that the apertures 26 and 28 should be slots which are each four inches long. It is believed that such a length of slot can accommodate most bell housings of transmissions. The slots are formed so as to accommodate the various distances between the bolt holes formed on the bell housing end.

Apertures 26 and 28 receive threaded members 30 and 32, respectively. Threaded members 30 and 32 extend through the apertures 26 and 28 so as to engage a threaded opening on the bell housing 13. These threaded members 30 and 32 are placed in position so as to affix the rigid plate 14 to the end of bell housing 13. In normal use, the threaded members 30 and 32 are cage nuts. These cage nuts 30 and 32 are adjustable so as to slide to-and-fro through the slots 26 and 28 and are adjustable to accommodate the various types of bell housings.

In FIG. 2, it can also be seen that a vertical slot 34 is formed between the apertures 26 and 28 and generally near the center of the rigid plate 14. Slot 34 is adapted so as to receive an abutment member 36 for securing the torque converter of the automatic transmission. Slot 34 is configured so as to allow the abutment member 36 to slide upwardly and downwardly and to be properly adjusted so that the torque converter can be properly secured. The abutment member 36 includes a cage nut which is suitable for engaging slot 34 and for supporting a threaded member therein.

Figure 3:
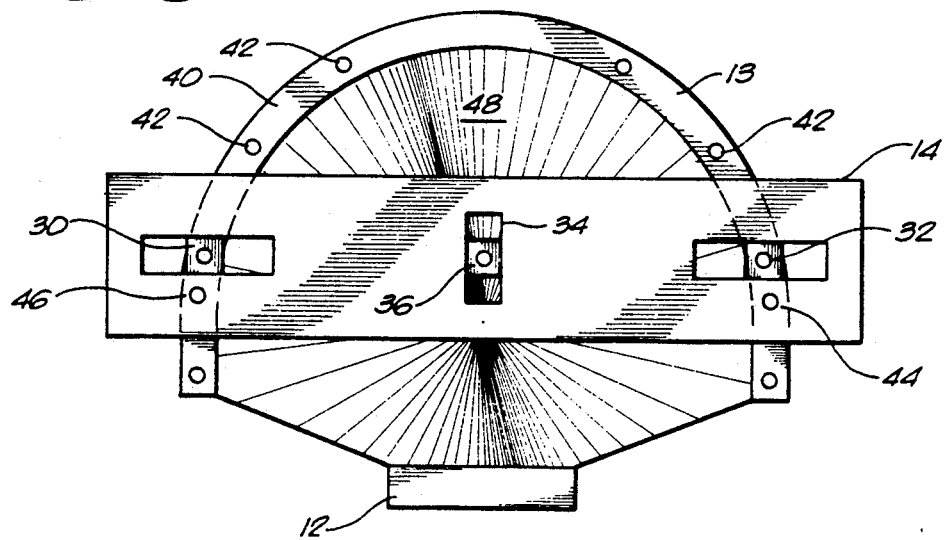
FIG. 3 is a frontal elevational view of the preferred embodiment of the present invention shown as affixed to the bell housing of a transmission.

Referring to FIG. 3, it can be seen how the fixing member 14 is affixed to the bell housing 13 of a transmission 12. As can be seen, the bell housing 13 has a rim 40 having a semi-circular configuration. A plurality of bolt holes 42 extend around and through the rim 40 of bell housing 13. It can be seen that the threaded members 30 and 32 are received by the bolt holes 42 of bell housing 13. These threaded member 30 and 32 can be tightened so as to secure the rigid plate 14 to the bell housing 13. Handles 44 and 46 are shown positioned on the rigid plate 14. These handles 44 and 46 are similar to handle 16 of FIG. 1 and extend perpendicularly outwardly from the flat surface of rigid plate 14. The vertical slot 34 and abutment member 36 are positioned centrally on the rigid plate 14. The abutment member 36 can be adapted so as to secure the torque converter in its proper position in the interior 48 of bell housing 13.

Figure 4:
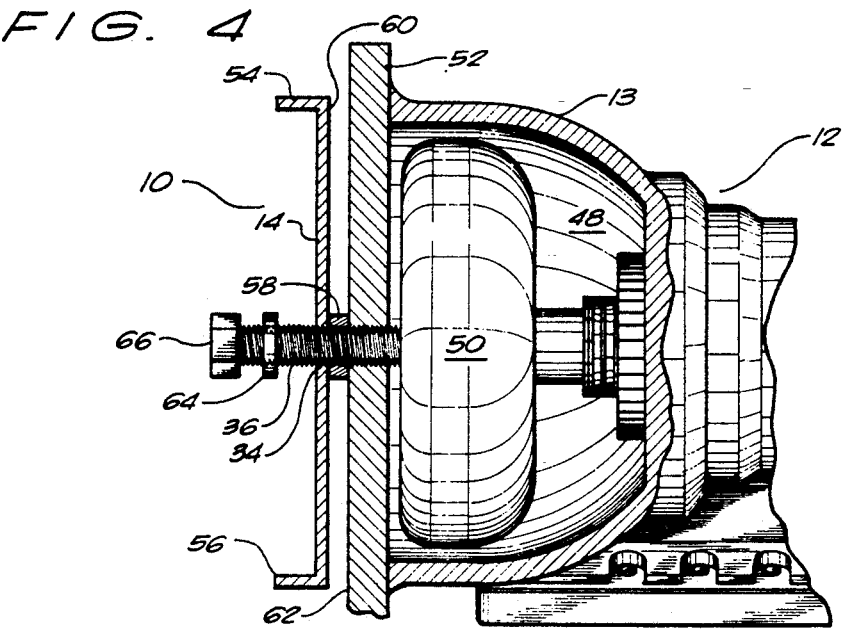
FIG. 4 is a side view of the device of the present invention shown as engaging a torque converter within the bell housing of a transmission.

FIG. 4 shows a cross-sectional side view of the bell housing 13 of transmission 12. As can be seen, the torque converter 50 is contained within the interior 48 of transmission 12. The bell housing 13 has an outer edge 52 to which the rigid plate 14 is affixed. The abutment member 36 extends into the interior 48 of bell housing 13 so as to secure the torque converter 50 in its proper position.

In FIG. 4, it can be seen that t he rigid plate 14 has longitudinal sides 54 and 56. In essence. The fixing member 14 has a E-shaped configuration. The longitudinal sides 54 and 56 extend outwardly in a direction opposite the direction of the abutment member 36. These longitudinal sides 54 and 56 generally have a length of one-half of an inch. The purpose of the longitudinal sides 54 and 56 is to provide additional rigidity and structural integrity to the fixing member 14. The use of the side walls 54 and 56 allows the rigid plate 14 to be formed of material of reduced thickness. These side walls 54 and 56 contribute to the economics of the present invention by eliminating much of the material cost. If the longitudinal sides 54 and 56 were not used, then the rigid plate 14 would have to be somewhat thicker so as to provide sufficient rigidity for the support of the device 10.

The abutment member 36 extends into the center vertical slot 34 formed in the rigid plate 14. Cage nut 58 is provided so as to secure the abutment member 36 in its proper position within slot 34. Cage nut 58 is interposed between the wall 60 of rigid plate 14 and the outer edge 62 of bell housing 13. The abutment member 36 is essentially a bolt having a suitable length so as to extend from the rigid plate 14 and enter into an abutting relationship with the torque converter 50 within t he bell housing 13. A retainer locknut 64 extends over the diameter of the abutment member 36. Bolt head 66 is formed at the outer edge of the abutment member 36 so as to allow easy adjustment of the abutment member 36 by the user of the device 10 of the present invention. A rotation of the bolt head 66 allows the abutment member 36 to be threaded into position so as to engage the torque converter 50.

Figure 5:
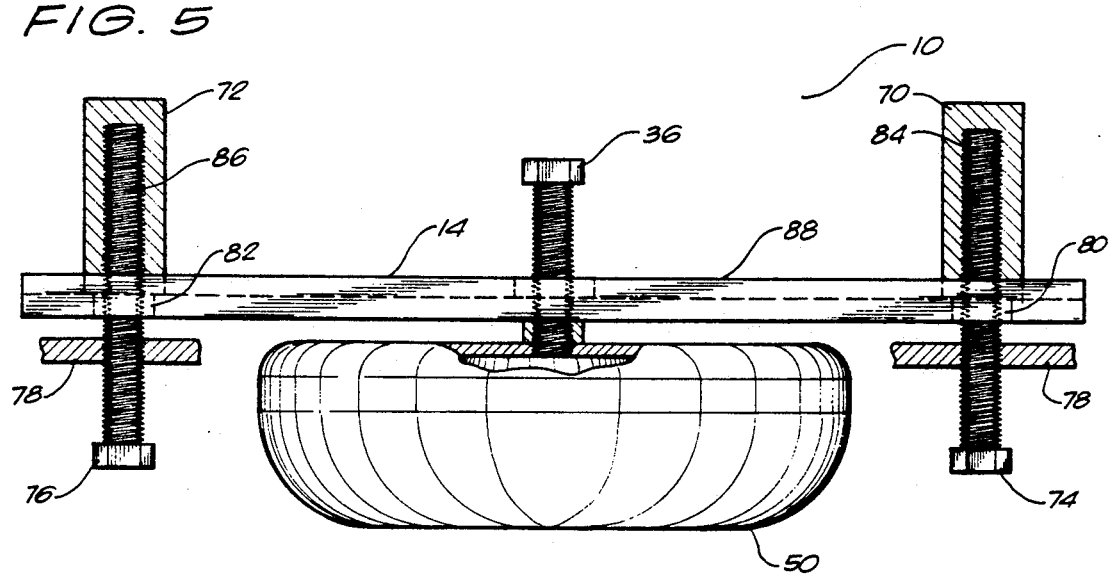
FIG. 5 is a top plan view showing the device of the present invention showing, in particular, the use of support handles.

FIG. 5 shows a top view of the device 10 of the present invention. In particular, FIG. 5 shows the use of handles 70 and 72. The rigid plate 14 receives the abutment member 36 therewithin. Abutment member 36 is adjusted so as to be in engagement with torque converter 50. It can be seen that bolts 74 and 76 extend through the wall 78 of the bell housing 13. The bolt heads 74 and 76 reside on the transmission side of the bell housing rim 78. These bolts 74 and 76 extend through the rim 78 and engage cage nuts 80 and 82, respectively. The ends 84 and 86 of bolts 74 and 76, respectively, extend outwardly beyond the wall 88 of rigid plate 14. Handles 70 and 72 have threaded interiors so as to engage the ends 84 and 86 of bolts 74 and 76, respectively. Handles 70 and 72 can be wood, plastic, or other material that has a suitable interior configuration for engaging the bolts 74 and 76. Once the device 10 is configured in the manner shown in FIG. 5, the bell housing of the transmission can be easily lifted.

Figure 6:
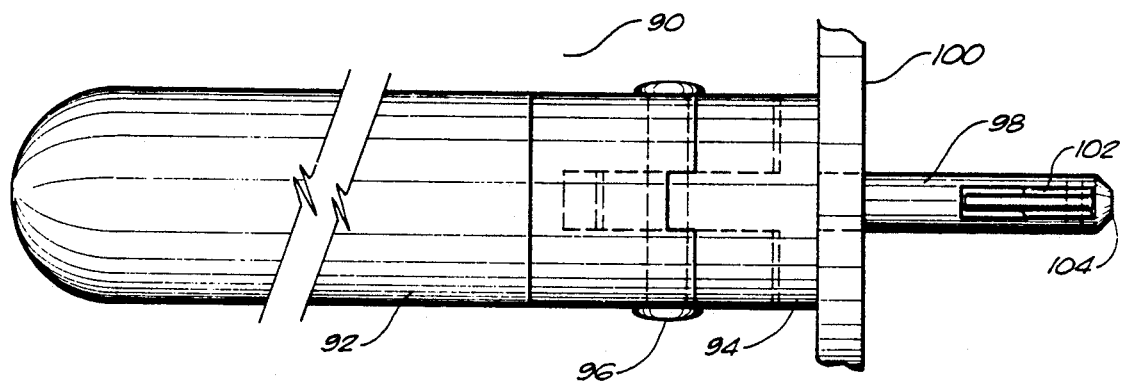
FIG. 6 is a top plan view of a support handle for the present invention.

FIG. 6 is a detailed illustration of handle 90 as can be used with the present invention. Handle 90 is shown as an alternative to the handles 70 and 72 as illustrated in FIG. 5. Handle 90 can be used in place of the bolted handle configuration illustrated in FIG. 5. In particular, handle 90 can be incorporated and adapted easily for use in lifting the transmission. Handle 90 can be manufactured from wood, steel, plastic, or other rigid material. Handle 90 includes a first portion 92 and a second portion 94. First portion 92 is pivotally connected about pivot point 96 relative to the second portion 94. In essence, the pivot point 96 acts as a folding mechanism for the handle 90. It can be seen that the second portion 94 includes an extension 98 which is suitable for extending through the rim 100 of the bell housing of the transmission. A locking mechanism 102 is provided at the end 104 of the extension 98 of second portion 94. Locking mechanism 102 can be moved in a suitable manner so as to provide a means for retention against the rim 100 of the bell housing.

Figure 7:
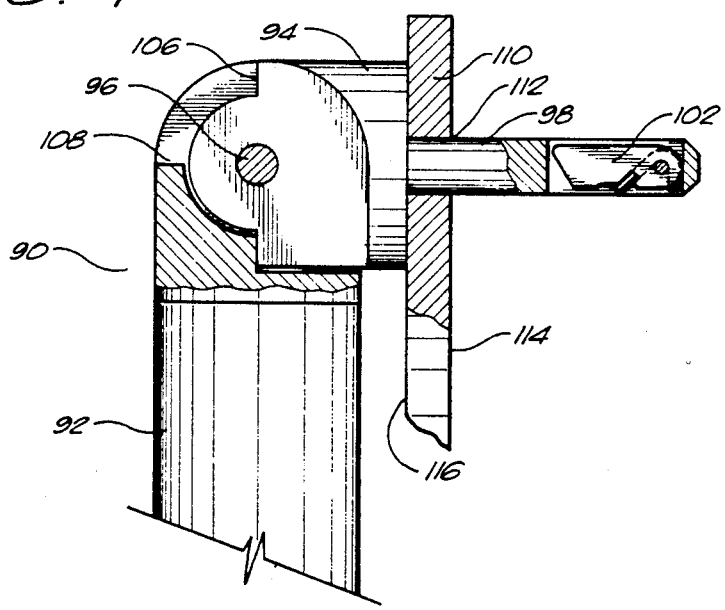
FIG. 7 is a side view showing an operation of the support handle of the present invention.

FIG. 7 shows the operation of the handle 90. In normal use, it is desirable to have a folding handle connected to the fixing member. As such, the fixing member, and the associated handles, can be stored along with the transmission without taking up unnecessary space. On the other hand, it is important for the folding handle 90 to have sufficient strength so as to withstand the forces necessary to lift the transmission. In FIG. 7, it can be seen how the first portion 92 of handle 90 is free to rotate about pivot point 96 with respect to the second portion 94 of the handle. A stop surface 106 is provided which will engage the stop surface 108 on the first portion 92 of handle 90. When it is necessary to lift the transmission 110, the extension 98 will extend through bolt hole 112 of transmission 110. The locking mechanism 102 can be rotated outwardly so as to provide a retention surface against the outer wall 114 of transmission 110. As such, the extension 98 is fixed in position. This causes the second portion 94 of handle 90 to be in abutment with surface 116. A rotation of the first portion 92 of handle 90 about pivot point 96 will cause the surface 108 to come into abutment with the surface 106 of second portion 94. As such, the handle 90 will be configured in the manner shown in FIG. 6 so as to allow the user to properly lift the transmission 110.

Figure 8:
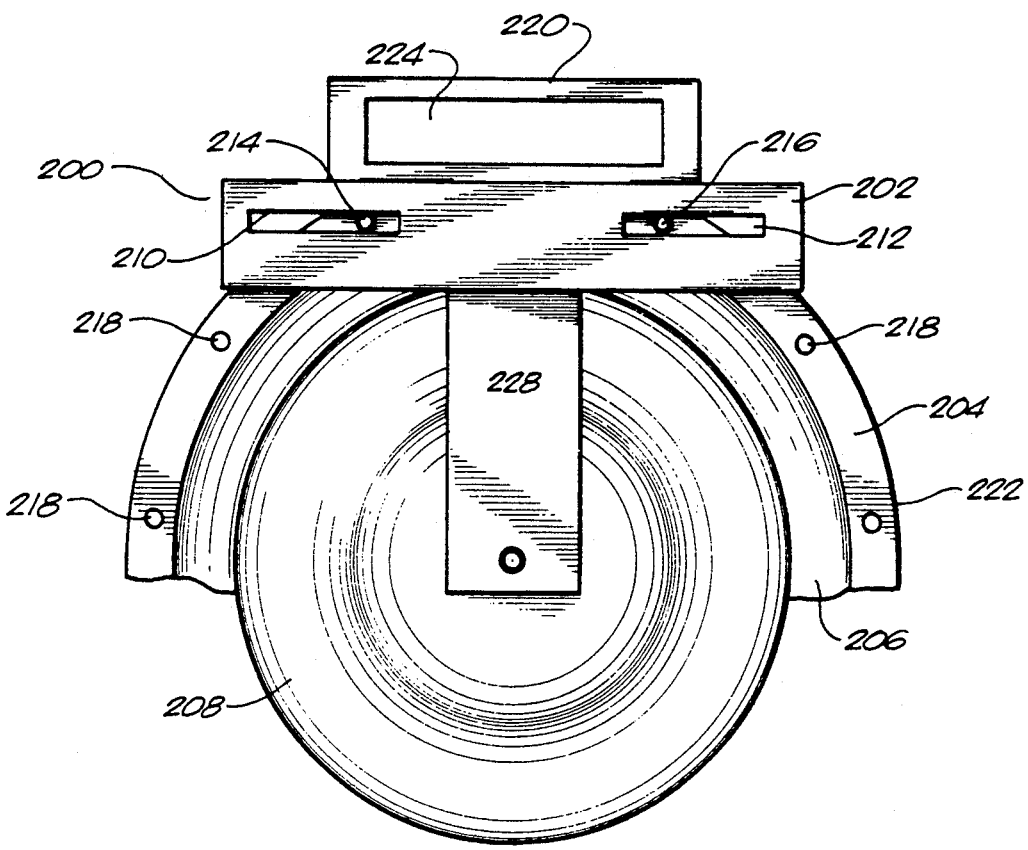
FIG. 8 is an alternative embodiment of the present invention showing, in particular, a framework for the receipt of a fork of a forklift.

FIG. 8 shows an alternative embodiment of the device 200 of the present invention. It can be seen that device 200 has a fixing member 202 extending across at least a portion of the rim 204 of bell housing 206. A torque converter 208 is retained within bell housing 206. The fixing member 202 is provided with a first aperture 210 and a second aperture 212. Threaded members 214 and 216 are provided within apertures 210 and 212, respectively. Threaded members 214 and 216 are designed so as to engage the bolt holes 218 of rim 204.

Importantly, the device 200 is configured for the retention of the torque converter 208 within bell housing 206 and also intended for use by a forklift for transport. In particular, a frame 220 is affixed to the top edge of fixing member 202. Frame 220 is configured so as to extend outwardly beyond the exterior surface 222 of bell housing 206. Frame 220 has a generally rectangular configuration. Frame 220 has an internal slot 224. Slot 224 has a suitable size for receiving a fork of a forklift. In normal use, the fork of the forklift can extend into slot 224 and can be used to lift the fixing member 202 and the attached bell housing 206.

Since it is necessary and important to the present invention to retain the torque converter 208 in its proper position, a downwardly extending frame member 228 extends from the fixing member 202. Member 228 is a vertical member that is attached to the bottom edge of the fixing member 202 and extends downwardly within the area of the bell housing 206. An abutment member 230 is provided on member 228 distal the fixing member 202. Abutment member 230 has a configuration of a type described herein previously. Abutment member 230 is suitable for engaging the torque converter 208 and for retaining the torque converter 208 in its proper position within bell housing 206.

Figure 9:
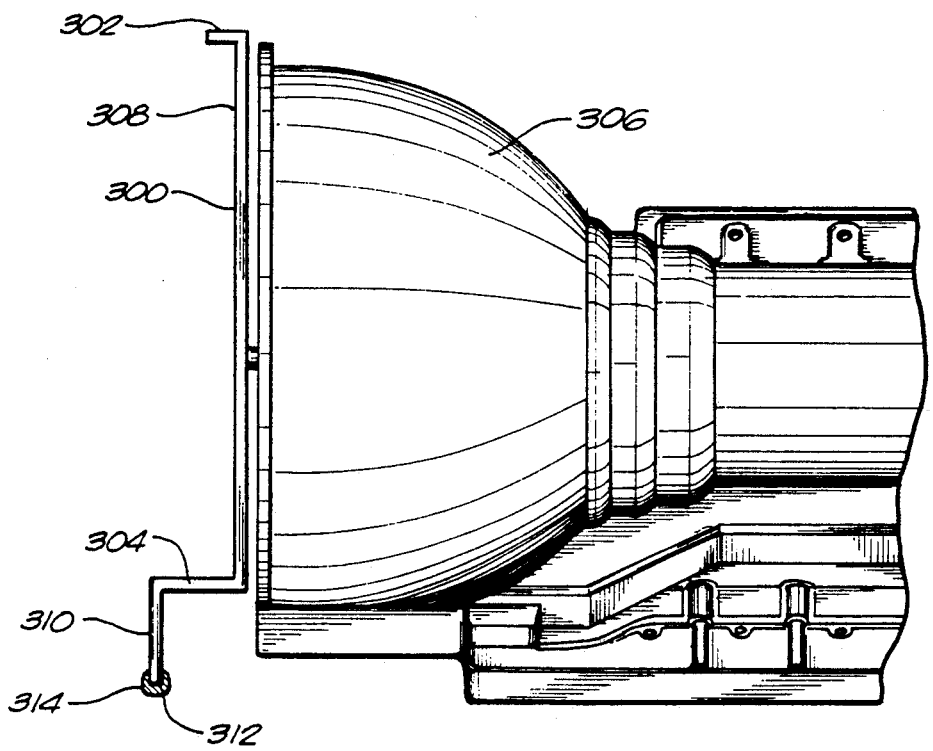
FIG. 9 is an illustration of an alternative configuration of the present invention showing, in particular, an alternative type of handle.

FIG. 9 shows an alternative embodiment of the handle mechanism of the present invention. In particular, in FIG. 9, it can be seen that the fixing member 300 has longitudinal sides 302 and 304 extending outwardly away from the transmission 306. The longitudinal sides 302 and 304 are formed by a conventional brake press acting on the edges of the rigid plate 300. In the previous embodiment, handles were formed so as to extend outwardly from the surface 308 of rigid plate 300. However, in many circumstances, the cost of providing such handles could be excessive. If it were desired to reduce the cost of the device of the present invention, then the scheme of FIG. 9 could be included.

It can be seen that the lower longitudinal side 304 has a vertical portion 310 extending downwardly therefrom. Vertical portion 310 is arranged generally parallel to the fixing member 300 but offset therefrom. The vertical portion 310 has a bottom edge 312 which can provide a gripping surface for a person desiring to lift the bell housing portion of transmission 306.

Since the edge 312 may be too sharp for comfort, a flexible wrapping material 314 may extend around edge 312. Flexible material 314 may be plastic, rubber, or other soft material which can provide a larger and softer surface area for the hands of the person manipulating the transmission 306. It is believed that the arrangement of FIG. 9 may be less expensive than the form of the device having handles extending outwardly from the surface of fixing member 300.

Figure 10:
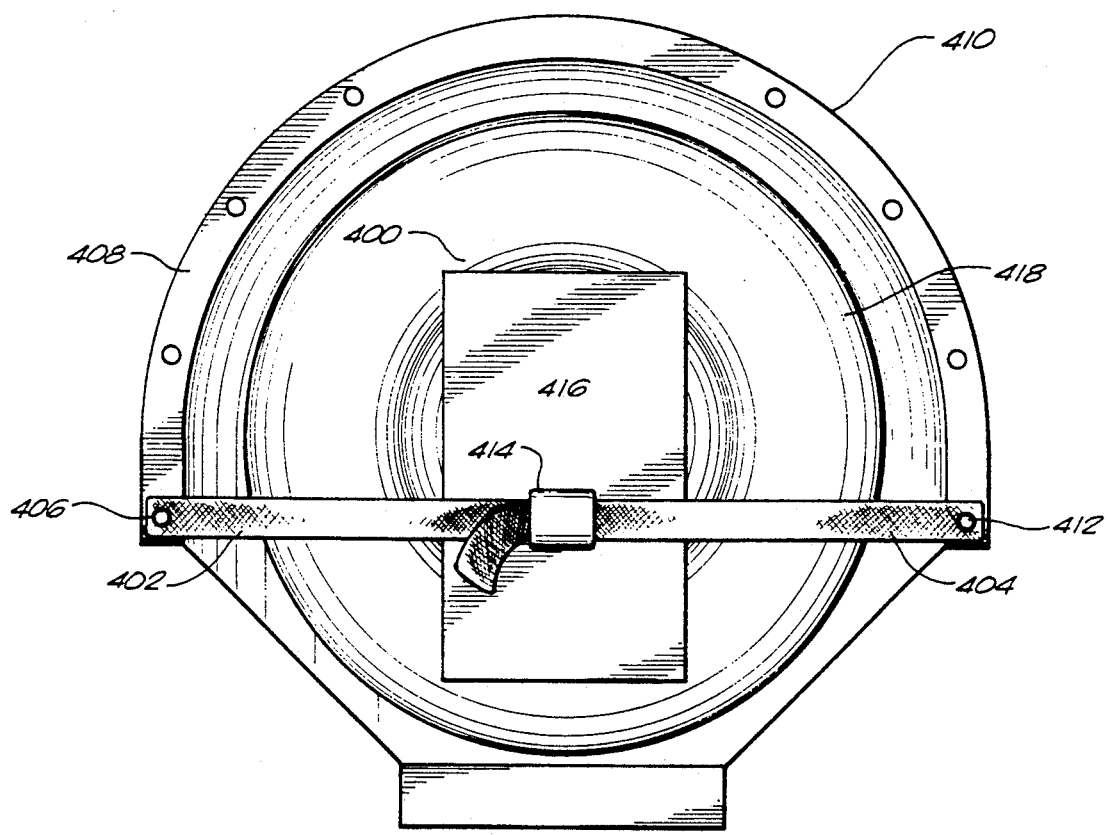
FIG. 10 is an alternative embodiment of the present invention utilizing flexible members for fixing the torque converter within the bell housing of a transmission.

FIG. 10 shows another embodiment of the present invention. The device 400 as illustrated in FIG. 10 is designed for additional cost savings. Device 400 includes a first strap 402 and a second strap 404. The first strap 402 is a flexible member that fastens to a bolt hole 406 on the rim 408 of bell housing 410. Strap 402 extends inwardly from bolt hole 406 toward the center of the bell housing 410. The second strap 404 is fastened to another bolt hole 412 formed on the other side of the rim 408 from bolt hole 406. Second strap 404 extends inwardly. A locking device 414 is joined to second strap 404 and connects with the first strap 402. In essence, the locking device 414 can be similar to a buckle or other fastener which is suitable for joining straps 402 and 404 together in a taut relationship. The abutment member 416 is provided so as to secure the torque converter 418 within the interior of bell housing 410. Abutment member 416 can be a block, or other device, which is interposed between the torque converter 418 and the straps 402 and 404. The abutment member 416 can be fastened to the locking device 414 or can simply be in abutting relationship between the straps 402 and 404 and the torque converter 418. The scheme illustrated in FIG. 10 is even a less expensive version of the present invention than that illustrated in the previous embodiments. Although the straps 402 and 404 do not provide a secure surface upon which the transmission can be effectively lifted, it does provide a cost effective means for the retention of the torque converter within the bell housing.

The present invention, in its various embodiments, offers an improved technique for the lifting of a transmission. By fastening to the bolt holes associated with the bell housing of the transmission. The present invention provides a secure surface upon which to lift the bell housing. Additionally, by providing a surface for abutment to the torque converter, the torque converter is retained in its natural position within the interior of the bell housing. The present invention eliminates the accidental dislodgment of the torque converter. It also prevents any damage to shafts and other materials associated with the torque converter. Importantly, by retaining the torque converter in its desired position, the present invention eliminates any fluid spillage that may occur by the dislodgment of the torque converter. The present invention is easy to use, easy to manipulate, and relatively inexpensive to manufacture. As such, the present invention offers an improved mechanism for the purposes described herein.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A device for retaining a torque converter within a bell housing of a transmission comprising:
   a fixing member extending across the bell housing;
   means for attaching said fixing member across the bell housing, said means for attaching comprising;
   a first elongated slot formed through said fixing member adjacent an end of said fixing member;
   a second elongated slot formed through said fixing member adjacent an opposite end of said fixing member;
   a first threaded member extending through said first elongated slot and engaging an opening on the bell housing; and
   a second threaded member extending through said second elongated slot and engaging another opening on the bell housing, said first and second threaded members for affixing said fixing member to the bell housing; and
   an abutment member connected to said fixing member and extending for an adjustable distance therefrom, said abutment member having an end surface abutting the torque converter so as to fix a position of the torque converter within the bell housing, said abutment member extending through a third elongated slot formed through said fixing member, said abutment member positioned generally centrally between said first and second elongated slots.

2. The device of claim 1, said abutment member comprising:
   an adjustable bolt threadedly fastened to said fixing member, said adjustable bolt having a surface engagable with the torque converted within the bell housing, said adjustable bolt extending through said fixing member.

3. The device of claim 2, said first elongated slot and said second elongated slot aligned with a fixing member.

4. The device of claim 3, said third elongated slot aligned transverse to said first and second elongated slots.

5. The device of claim 1, said fixing member having longitudinal sides extending perpendicular thereto.

6. The device of claim 5, said longitudinal sides extending in one direction from said fixing member, said abutment member extending perpendicularly in an opposite direction from said fixing member.

7. A device comprising:
   a bell housing of a transmission, said bell housing having an end surface;
   a rigid plate;
   means for attaching said rigid plate generally horizontally across said end surface of said bell housing;
   an abutment member connected to said rigid plate and extending outwardly a distance therefrom, said abutment member having an end extending into an interior of said bell housing inwardly of said end surface, said end for abutment with a torque converter within said bell housing; and
   handle means fastened to a side of said rigid plate opposite said abutment member.

* * * * *